W. F. STIMPSON.
COFFEE GRINDER.
APPLICATION FILED NOV. 19, 1908.
1,086,868.
Patented Feb. 10, 1914.
2 SHEETS—SHEET 1.
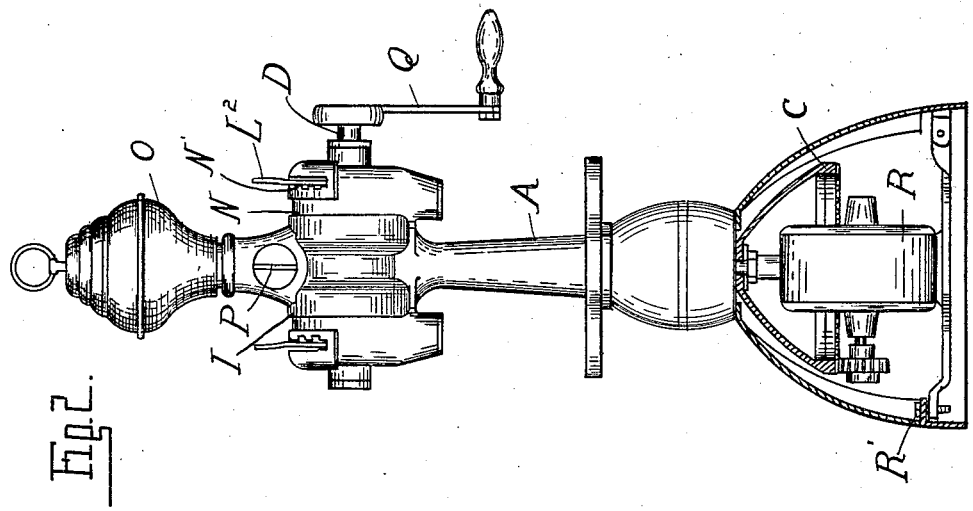
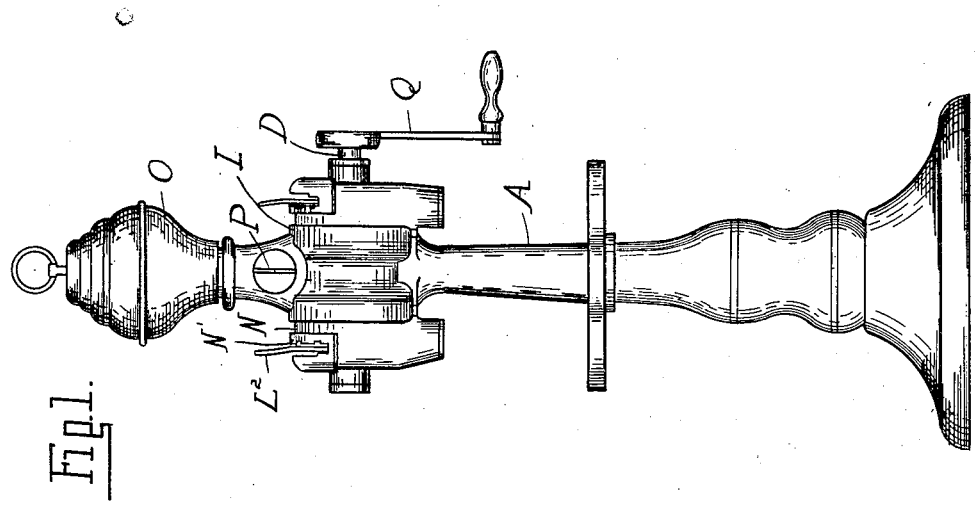
Witnesses
Inventor
Walter F. Stimpson
By Whittemore Hulbert + Whittemore
Attys

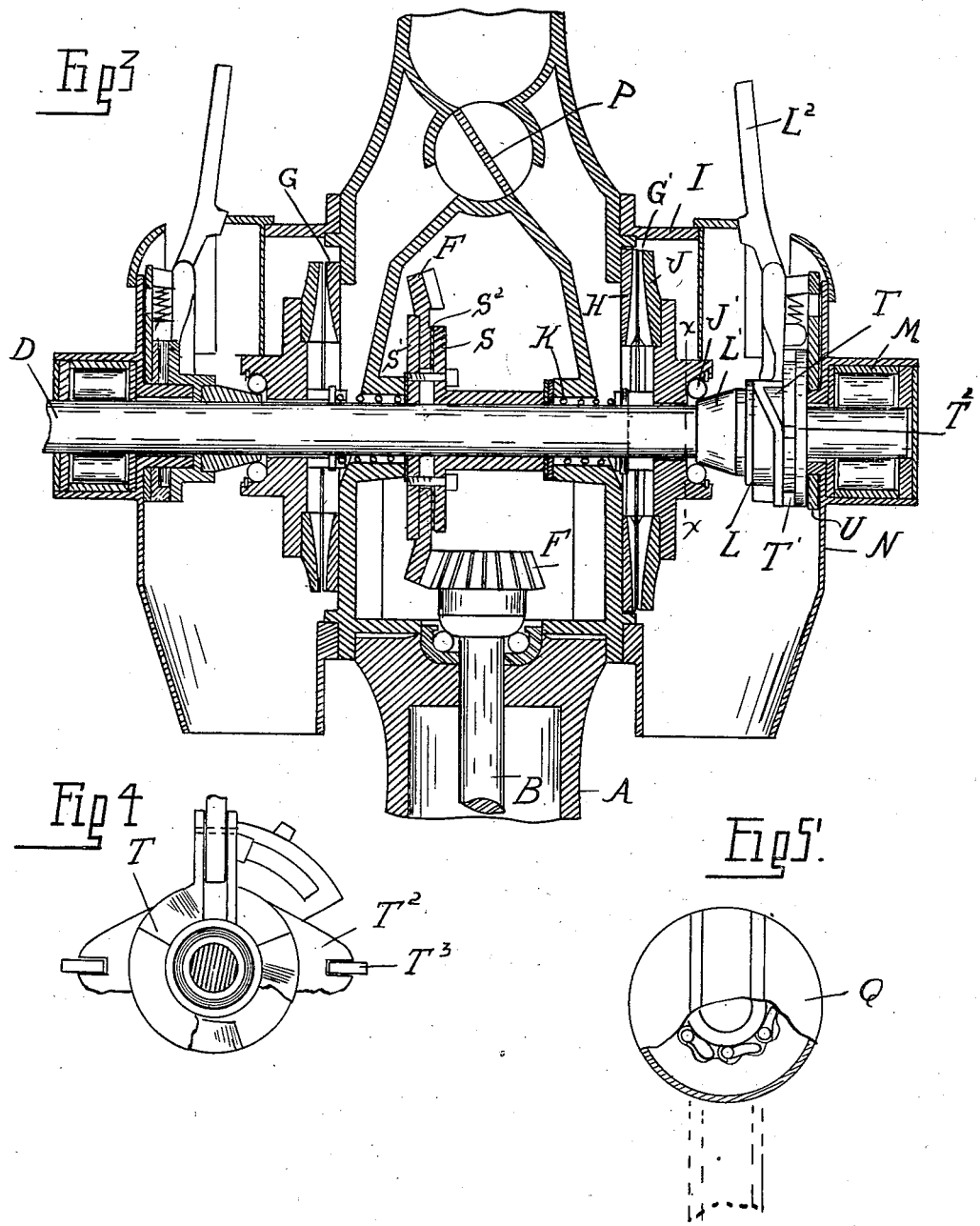

UNITED STATES PATENT OFFICE.

WALTER F. STIMPSON, OF DETROIT, MICHIGAN, ASSIGNOR TO STIMPSON SCALE AND MANUFACTURING COMPANY, OF NORTHVILLE, MICHIGAN, A CORPORATION OF MICHIGAN.

COFFEE-GRINDER.

1,086,868.  Specification of Letters Patent.  Patented Feb. 10, 1914.

Application filed November 19, 1908. Serial No. 463,416.

*To all whom it may concern:*

Be it known that I, WALTER F. STIMPSON, a citizen of the United States of America, residing at Detroit, in the county of Wayne and State of Michigan, have invented certain new and useful Improvements in Coffee-Grinders, of which the following is a specification, reference being had therein to the accompanying drawings.

The invention relates to coffee grinders, and consists in various features of construction as hereinafter set forth.

In the drawings Figure 1 is an elevation of a hand-operated machine; Fig. 2 is a similar view of a machine that may be operated either manually or by a motor; Fig. 3 is a vertical section through the machine longitudinally of the grinder shaft; Fig. 4 is a section on line $x-x$, Fig. 3; and Fig. 5 is a sectional elevation of the ratchet crank.

In the construction of coffee grinders it is desirable to so proportion the parts, and particularly the size of the grinders, as to obtain as large a capacity as possible without exceeding the power which may be easily developed by hand. In other words, the machine must operate easily and at the same time grind as quickly as possible. In practical use, the coffee is ground to various degrees of fineness and for the finer grades, and particularly the pulverized coffee, more power is required with a given size of grinder than for the coarser grades. It is therefore apparent that if the grinders are proportioned for easy operation and the maximum capacity, where grinding coarse they will be difficult to operate when grinding fine; or, if proportioned for easy operation in fine grinding they will be lacking in capacity for coarse grinding. This difficulty I have avoided by providing two sets of grinders of different size and capacity, and which are operated by the same mechanism. One set of grinders is proportioned for maximum capacity within the power limits for the fine grades, and the other is correspondingly proportioned for the coarser grades.

In detail, A is a hollow pedestal within which is arranged a vertical shaft B having mounted on its lower end a fly wheel C.

D is a horizontal shaft which is connected with the vertical shaft through the bevel gear wheels F and F. Upon opposite sides of these gear wheels are arranged pairs of grinders G and G' respectively for the fine and coarse grindings. Each set of grinders comprises a stationary toothed disk H, which is mounted upon the frame I secured to the pedestal, and a rotary toothed grinder disk J feathered upon the shaft D. A spring K is placed between the frame I and the hub of the grinder J and operates to separate said grinder from the stationary disk H.

L is a member sleeved upon the shaft G and provided with a conical bearing L' which engages a ball bearing J' in the grinder J. The outer face of this member L is cammed and has a thrust bearing upon the stationary frame, the arrangement being such that by relatively adjusting said member L it will be moved longitudinally of the shaft D and will adjust the member J toward or from the coöperating member H. Beyond the member L a roller bearing M is arranged to form a journal for the shaft D, and this bearing is placed in a pocket in the casing N, which surrounds the grinders. Thus the shaft B is journaled at its opposite ends and the bearings are sufficiently removed from the grinders to permit of lubrication without danger of the mixing of the lubricant with the coffee.

For holding the unground coffee, a receptacle O is arranged above the frame I, and a rotary gate P is arranged to control the discharge from this receptacle and to direct it alternatively to the fine and coarse grinders. The discharge passage to these grinders is formed within the frame I through a central recess within the grinders H and J from which the coffee is fed outward between the grinding faces.

Upon one end of the shaft D is arranged an operating crank Q, which has a ratchet engagement with the shaft so as to permit the independent rotation of the latter through the momentum of the fly wheel, or, where a motor R is used, it is placed in the base of the pedestal and has a detachable drive connection with the fly wheel C, preferably a pinion on the motor shaft engaging gear teeth on the under side of the fly wheel and thrown into or out of mesh therewith by raising or lowering the motor frame, as by the adjusting screw R'.

With the construction as thus far described, in operation the machine may be driven either by the crank Q or by the motor R. Where the former is used, the motor is lowered to disengage the pinion from the gear teeth on the fly wheel so as to permit the latter to rotate freely. Motion is then imparted to the mechanism by the operation of the crank and the movement is communicated from the shaft D to the shaft B and fly wheel C. The gear F is of larger diameter than the pinion E, and consequently the shaft B will be driven at a higher angular speed so that a greater momentum is acquired by the fly wheel than if arranged directly upon the shaft B. This permits of making the wheel small enough to go within the base of the pedestal and at the same time provides sufficient factor of inertia to steady the operation of the machine. If the coffee is to be ground fine, the gate P is turned to deflect the material into the grinder G, while for the coarser grinding the gate is turned opposite to deflect the coffee into the grinder G'. Both of these grinders are capable of being adjusted by a rotation of their respective bearing members L, and this adjustment is effected by a handle $L^2$, which engages a notched bearing N' in the casing N.

It frequently happens that the unground coffee contains foreign substance, such as pieces of metal, which would break the teeth of the grinder if dropped thereon when the machine is in operation. To avoid this, I have placed a friction coupling between the gear F on the shaft D, this being so adjusted as to yield under an abnormal stress and permit the grinders to remain stationary during the continued rotation of the fly wheel. This friction, as shown, consists of a pair of clamping plates S S' secured to the hub upon the shaft D and engaging the web of the wheel F with a washer $S^2$ of fiber or other suitable material in between. The plates may be clamped with just sufficient tension to drive the grinders under normal load, and thus the introduction of any foreign substance of a harder nature than coffee will arrest movement of the grinders and gear while the fly wheel continues to rotate.

Where a nail or other foreign substance arrests the grinders, as above described, it is necessary to separate the disks a sufficient distance to permit the dislodgment of the same. This is accomplished by forming the cam face on the member L with pockets T which engage bearing lugs T' on the thrust member $T^2$. The pockets are of sufficient depth to permit of withdrawing the disk J a greater distance from the disk H than is necessary for the coarsest adjustment of the grinders, and thus at any time said grinders may be separated for the dislodgment of any clogging substance.

The member $T^2$ is held from rotation by the engagement with lugs $T^3$ upon the casing N and a rotary adjustable cammed plate U is arranged between the plate $T^2$ and the casing. This plate U is adjustable for the purpose of compensation for any wear in the grinders, so that the adjustment of the member L in any one position will always produce the same degree of fineness in the grinding.

What I claim as my invention is:

1. In a coffee mill, the combination of a drive shaft, of a coarse grinder driven from said shaft, a pulverizing grinder also driven from said shaft, and of lesser capacity than the coarse grinder to substantially equalize the power required to drive said shaft in the same relative positions of adjustment of said grinders, said grinders being adapted for independent use, and means for independently feeding material to said grinders.

2. In a coffee grinder, the combination of a shaft, of a hand crank for rotating the same, a coarse grinder mounted on and driven by said shaft, a pulverizing grinder also mounted on and driven by said shaft and of lesser capacity than the coarse grinder to substantially equalize the power required to drive the shaft in the same relative positions of adjustment of said grinders, said grinders being adapted for independent use, and means for independently feeding material to the grinders.

3. In a coffee mill, the combination with a shaft, of a hand crank for rotating the same, a coarse and a pulverizing grinder mounted on and driven by said shaft and adapted for independent use, each of said grinders comprising complementary disks, the disks of the pulverizing grinder having the grinding surface thereof of lesser size than the grinding surfaces of the disk of the coarse grinder whereby said pulverizing grinder is of lesser capacity than the coarse grinder, to substantially equalize the power required to drive said shaft in the same relative positions of adjustment of said grinders, and means for independently feeding material to said grinders.

In testimony whereof I affix my signature in presence of two witnesses.

WALTER F. STIMPSON.

Witnesses:
  NELLIE KINSELLA,
  JAMES P. BARRY.